(12) United States Patent
Kerofsky

(10) Patent No.: US 8,165,724 B2
(45) Date of Patent: Apr. 24, 2012

(54) METHODS AND SYSTEMS FOR POWER-CONTROLLING DISPLAY DEVICES

(75) Inventor: Louis Joseph Kerofsky, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 407 days.

(21) Appl. No.: 12/486,743

(22) Filed: Jun. 17, 2009

(65) Prior Publication Data

US 2010/0321574 A1    Dec. 23, 2010

(51) Int. Cl.
*G06F 19/00* (2011.01)

(52) U.S. Cl. .......................... 700/291; 700/295; 705/412

(58) Field of Classification Search .......... 700/295–296, 700/291; 705/7.38, 412; 340/870.02, 870.11; 348/730
See application file for complete search history.

(56) References Cited

U.S. PATENT DOCUMENTS

| | | | |
|---|---|---|---|
| 4,020,462 A | 4/1977 | Morrin | |
| 4,196,452 A | 4/1980 | Warren et al. | |
| 4,223,340 A | 9/1980 | Bingham et al. | |
| 4,268,864 A | 5/1981 | Green | |
| 4,317,175 A * | 2/1982 | Sterling et al. | 705/412 |
| 4,399,461 A | 8/1983 | Powell | |
| 4,402,006 A | 8/1983 | Karlock | |
| 4,523,230 A | 6/1985 | Carlson et al. | |
| 4,536,796 A | 8/1985 | Harlan | |
| 4,549,212 A | 10/1985 | Bayer | |
| 4,553,165 A | 11/1985 | Bayer | |
| 4,709,262 A | 11/1987 | Spieth | |
| 4,847,603 A | 7/1989 | Blanchard | |
| 4,962,426 A | 10/1990 | Naoi et al. | |
| 5,025,312 A | 6/1991 | Faroudja | |
| 5,046,834 A | 9/1991 | Dietrich | |
| 5,081,529 A | 1/1992 | Collette | |
| 5,176,224 A | 1/1993 | Spector | |
| 5,218,649 A | 6/1993 | Kunda et al. | |
| 5,227,869 A | 7/1993 | Degawa | |
| 5,235,434 A | 8/1993 | Wober | |
| 5,260,791 A | 11/1993 | Lubin | |
| 5,270,818 A | 12/1993 | Ottenstein | |
| 5,389,978 A | 2/1995 | Jeong-Hun | |
| 5,526,446 A | 6/1996 | Adelson | |

(Continued)

FOREIGN PATENT DOCUMENTS

EP        0841652        5/1998

(Continued)

OTHER PUBLICATIONS

International Application No. PCT/JP2010/057107—International Search Report.

(Continued)

*Primary Examiner* — Albert Decady
*Assistant Examiner* — Douglas Lee
(74) *Attorney, Agent, or Firm* — Chernoff Vilhauer McClung & Stenzel

(57) ABSTRACT

Aspects of the present invention relate to methods and systems for controlling power consumption with a power controlling display device. Some aspects relate to a power controlling display device that receives power cost data and user preferences and generates a power consumption schedule that may control internal display components as well as connected power consuming devices. Some aspects relate to methods and systems for automatically compensating a displayed image when display backlight levels are modified due to power regulation.

20 Claims, 5 Drawing Sheets

U.S. PATENT DOCUMENTS

| | | |
|---|---|---|
| 5,528,257 A | 6/1996 | Okumura et al. |
| 5,651,078 A | 7/1997 | Chan |
| 5,696,852 A | 12/1997 | Minoura et al. |
| 5,760,760 A | 6/1998 | Helms |
| 5,808,697 A | 9/1998 | Fujimura et al. |
| 5,857,033 A | 1/1999 | Kim |
| 5,905,442 A * | 5/1999 | Mosebrook et al. ............ 340/3.7 |
| 5,912,992 A | 6/1999 | Sawanda et al. |
| 5,920,653 A | 7/1999 | Silverstein |
| 5,952,992 A | 9/1999 | Helms |
| 5,956,014 A | 9/1999 | Kuriyama |
| 6,055,340 A | 4/2000 | Nagao |
| 6,075,563 A | 6/2000 | Hung |
| 6,275,207 B1 | 8/2001 | Nitta et al. |
| 6,278,421 B1 | 8/2001 | Ishida |
| 6,285,798 B1 | 9/2001 | Lee |
| 6,317,521 B1 | 11/2001 | Gallagher |
| 6,424,730 B1 | 7/2002 | Wang et al. |
| 6,445,835 B1 | 9/2002 | Qian |
| 6,504,953 B1 | 1/2003 | Behrends |
| 6,507,668 B1 | 1/2003 | Park |
| 6,516,100 B1 | 2/2003 | Qian |
| 6,546,741 B2 | 4/2003 | Yun |
| 6,560,018 B1 | 5/2003 | Swanson |
| 6,573,961 B2 | 6/2003 | Jiang et al. |
| 6,583,579 B2 | 6/2003 | Tsumura |
| 6,593,934 B1 | 7/2003 | Liaw et al. |
| 6,594,388 B1 | 7/2003 | Gindele et al. |
| 6,600,470 B1 | 7/2003 | Tsuda |
| 6,618,042 B1 | 9/2003 | Powell |
| 6,618,045 B1 | 9/2003 | Lin |
| 6,628,823 B1 | 9/2003 | Holm |
| 6,677,959 B1 | 1/2004 | James |
| 6,728,416 B1 | 4/2004 | Gallagher |
| 6,753,835 B1 | 6/2004 | Sakai |
| 6,782,137 B1 | 8/2004 | Avinash |
| 6,788,280 B2 | 9/2004 | Ham |
| 6,795,063 B2 | 9/2004 | Endo et al. |
| 6,809,717 B2 | 10/2004 | Asao |
| 6,809,718 B2 | 10/2004 | Wei et al. |
| 6,816,141 B1 | 11/2004 | Fergason |
| 6,816,156 B2 | 11/2004 | Sukeno et al. |
| 6,934,772 B2 | 8/2005 | Bui et al. |
| 7,006,688 B2 | 2/2006 | Zaklika et al. |
| 7,010,160 B1 | 3/2006 | Yoshida |
| 7,049,976 B2 * | 5/2006 | Hunt et al. ............... 340/870.02 |
| 7,068,328 B1 | 6/2006 | Mino |
| 7,088,388 B2 | 8/2006 | MacLean et al. |
| 7,098,927 B2 | 8/2006 | Daly et al. |
| 7,110,062 B1 | 9/2006 | Whitted et al. |
| 7,142,218 B2 | 11/2006 | Yoshida |
| 7,142,712 B2 | 11/2006 | Maruoka et al. |
| 7,158,686 B2 | 1/2007 | Gindele |
| 7,199,776 B2 | 4/2007 | Ikeda et al. |
| 7,202,458 B2 | 4/2007 | Park |
| 7,221,408 B2 | 5/2007 | Kim |
| 7,253,814 B2 | 8/2007 | Kim et al. |
| 7,259,769 B2 | 8/2007 | Diefenbaugh |
| 7,287,860 B2 | 10/2007 | Yoshida et al. |
| 7,289,154 B2 | 10/2007 | Gindele |
| 7,317,439 B2 | 1/2008 | Hata et al. |
| 7,330,287 B2 | 2/2008 | Sharman |
| 7,352,347 B2 | 4/2008 | Fergason |
| 7,352,352 B2 | 4/2008 | Oh et al. |
| 7,394,448 B2 | 7/2008 | Park et al. |
| 7,403,318 B2 | 7/2008 | Miyazawa et al. |
| 7,433,096 B2 | 10/2008 | Chase et al. |
| 7,443,377 B2 | 10/2008 | Kim |
| 7,532,239 B2 | 5/2009 | Hayaishi |
| 7,564,438 B2 | 7/2009 | Kao et al. |
| 7,639,220 B2 | 12/2009 | Yoshida et al. |
| 2001/0031084 A1 | 10/2001 | Cannata et al. |
| 2002/0008784 A1 | 1/2002 | Shirata et al. |
| 2002/0057238 A1 | 5/2002 | Nitta |
| 2002/0167629 A1 | 11/2002 | Blanchard |
| 2002/0181797 A1 | 12/2002 | Young |
| 2003/0001815 A1 | 1/2003 | Cui |
| 2003/0012437 A1 | 1/2003 | Zaklika et al. |
| 2003/0051179 A1 | 3/2003 | Tsirkel |
| 2003/0053690 A1 | 3/2003 | Trifonov |
| 2003/0058464 A1 | 3/2003 | Loveridge et al. |
| 2003/0146919 A1 | 8/2003 | Kawashima |
| 2003/0169248 A1 | 9/2003 | Kim |
| 2003/0179213 A1 | 9/2003 | Liu |
| 2003/0193405 A1 * | 10/2003 | Hunt et al. ............... 340/870.02 |
| 2003/0193472 A1 | 10/2003 | Powell |
| 2003/0201968 A1 | 10/2003 | Itoh |
| 2003/0223634 A1 | 12/2003 | Gallagher et al. |
| 2003/0227577 A1 | 12/2003 | Allen et al. |
| 2003/0235342 A1 | 12/2003 | Gindele |
| 2004/0001184 A1 | 1/2004 | Gibbons |
| 2004/0024483 A1 * | 2/2004 | Holcombe ................... 700/122 |
| 2004/0081363 A1 | 4/2004 | Gindele et al. |
| 2004/0095531 A1 | 5/2004 | Jiang et al. |
| 2004/0113905 A1 | 6/2004 | Mori et al. |
| 2004/0113906 A1 | 6/2004 | Lew |
| 2004/0119950 A1 | 6/2004 | Penn |
| 2004/0130556 A1 | 7/2004 | Nokiyama |
| 2004/0160435 A1 | 8/2004 | Cui |
| 2004/0170316 A1 | 9/2004 | Saquib |
| 2004/0198468 A1 | 10/2004 | Patel et al. |
| 2004/0201562 A1 | 10/2004 | Funamoto |
| 2004/0207609 A1 | 10/2004 | Hata |
| 2004/0207635 A1 | 10/2004 | Miller |
| 2004/0208363 A1 | 10/2004 | Berge et al. |
| 2004/0239612 A1 | 12/2004 | Asao |
| 2004/0257324 A1 | 12/2004 | Hsu |
| 2005/0001801 A1 | 1/2005 | Kim |
| 2005/0057484 A1 | 3/2005 | Diefenbaugh |
| 2005/0104837 A1 | 5/2005 | Baik |
| 2005/0104839 A1 | 5/2005 | Baik |
| 2005/0104840 A1 | 5/2005 | Sohn |
| 2005/0104841 A1 | 5/2005 | Sohn et al. |
| 2005/0117186 A1 | 6/2005 | Li et al. |
| 2005/0117798 A1 | 6/2005 | Patton et al. |
| 2005/0140616 A1 | 6/2005 | Sohn et al. |
| 2005/0140639 A1 | 6/2005 | Oh et al. |
| 2005/0147317 A1 | 7/2005 | Daly et al. |
| 2005/0152614 A1 | 7/2005 | Daly et al. |
| 2005/0184952 A1 | 8/2005 | Konno |
| 2005/0190142 A1 | 9/2005 | Ferguson |
| 2005/0195212 A1 | 9/2005 | Kurumisawa |
| 2005/0200868 A1 | 9/2005 | Yoshida |
| 2005/0212972 A1 | 9/2005 | Suzuki |
| 2005/0232482 A1 | 10/2005 | Ikeda et al. |
| 2005/0244053 A1 | 11/2005 | Hayaishi |
| 2005/0248503 A1 | 11/2005 | Schobben et al. |
| 2005/0248593 A1 | 11/2005 | Feng et al. |
| 2005/0270265 A1 | 12/2005 | Plut |
| 2006/0012987 A9 | 1/2006 | Ducharme et al. |
| 2006/0015758 A1 | 1/2006 | Yoon |
| 2006/0061563 A1 | 3/2006 | Fleck |
| 2006/0072158 A1 | 4/2006 | Christie |
| 2006/0077405 A1 | 4/2006 | Topfer et al. |
| 2006/0103549 A1 * | 5/2006 | Hunt et al. ............... 340/870.02 |
| 2006/0119612 A1 | 6/2006 | Kerofsky |
| 2006/0119613 A1 | 6/2006 | Kerofsky |
| 2006/0120489 A1 | 6/2006 | Lee |
| 2006/0146236 A1 | 7/2006 | Wu et al. |
| 2006/0174105 A1 | 8/2006 | Park |
| 2006/0197735 A1 * | 9/2006 | Vuong et al. .................. 345/102 |
| 2006/0209003 A1 | 9/2006 | Kerofsky |
| 2006/0209005 A1 | 9/2006 | Pedram et al. |
| 2006/0221046 A1 | 10/2006 | Sato |
| 2006/0238827 A1 | 10/2006 | Ikeda |
| 2006/0256840 A1 | 11/2006 | Alt |
| 2006/0262111 A1 | 11/2006 | Kerofsky |
| 2006/0267923 A1 | 11/2006 | Kerofsky |
| 2006/0284822 A1 | 12/2006 | Kerofsky |
| 2006/0284823 A1 | 12/2006 | Kerofsky |
| 2006/0284882 A1 | 12/2006 | Kerofsky |
| 2007/0001997 A1 | 1/2007 | Kim et al. |
| 2007/0002004 A1 | 1/2007 | Woo |
| 2007/0018951 A1 | 1/2007 | Nobori et al. |
| 2007/0035565 A1 | 2/2007 | Kerofsky |
| 2007/0092139 A1 | 4/2007 | Daly |
| 2007/0097069 A1 | 5/2007 | Kurokawa |

| Pub. No. | Kind | Date | Inventor |
|---|---|---|---|
| 2007/0103418 A1 | | 5/2007 | Ogino |
| 2007/0126757 A1 | | 6/2007 | Itoh |
| 2007/0146236 A1 | | 6/2007 | Kerofsky et al. |
| 2007/0211049 A1 | | 9/2007 | Kerofsky |
| 2007/0229250 A1* | | 10/2007 | Recker et al. .................. 340/531 |
| 2007/0268524 A1 | | 11/2007 | Nose |
| 2008/0024517 A1 | | 1/2008 | Kerofsky |
| 2008/0037867 A1 | | 2/2008 | Lee |
| 2008/0055228 A1 | | 3/2008 | Glen |
| 2008/0074372 A1 | | 3/2008 | Baba |
| 2008/0094426 A1 | | 4/2008 | Kimpe |
| 2008/0180373 A1 | | 7/2008 | Mori |
| 2008/0208551 A1 | | 8/2008 | Kerofsky et al. |
| 2008/0231581 A1 | | 9/2008 | Fujine |
| 2008/0238840 A1 | | 10/2008 | Raman et al. |
| 2009/0002285 A1 | | 1/2009 | Baba |
| 2009/0015602 A1 | | 1/2009 | Rumreich et al. |
| 2009/0051714 A1 | | 2/2009 | Ohhara |
| 2009/0109232 A1 | | 4/2009 | Kerofsky |
| 2009/0167658 A1 | | 7/2009 | Yamane et al. |
| 2009/0167673 A1 | | 7/2009 | Kerofsky et al. |
| 2009/0174636 A1 | | 7/2009 | Kohashikawa et al. |
| 2010/0010857 A1* | | 1/2010 | Fadell ............................... 705/8 |
| 2010/0123725 A1* | | 5/2010 | Azar et al. ..................... 345/501 |
| 2010/0321587 A1* | | 12/2010 | Kerofsky ...................... 348/730 |

FOREIGN PATENT DOCUMENTS

| | | |
|---|---|---|
| EP | 963112 | 12/1999 |
| EP | 1788550 | 5/2007 |
| FR | 2782566 | 2/2000 |
| JP | 3102579 | 4/1991 |
| JP | 3284791 | 12/1991 |
| JP | 8009154 | 1/1996 |
| JP | 11-041808 | 2/1999 |
| JP | 11194317 | 7/1999 |
| JP | 11-313441 | 11/1999 |
| JP | 200056738 | 2/2000 |
| JP | 2000148072 | 5/2000 |
| JP | 2000259118 | 9/2000 |
| JP | 2001057650 | 2/2001 |
| JP | 2001083940 | 3/2001 |
| JP | 2001086393 | 3/2001 |
| JP | 2001298631 | 10/2001 |
| JP | 2001350134 | 12/2001 |
| JP | 2002189450 | 7/2002 |
| JP | 2003259383 | 9/2003 |
| JP | 2003271106 | 9/2003 |
| JP | 2003316318 | 11/2003 |
| JP | 2004007076 | 1/2004 |
| JP | 200445634 | 2/2004 |
| JP | 2004133577 | 4/2004 |
| JP | 2004177547 | 6/2004 |
| JP | 2004272156 | 9/2004 |
| JP | 2004287420 | 10/2004 |
| JP | 2004325628 | 11/2004 |
| JP | 2005346032 | 12/2005 |
| JP | 2006042191 | 2/2006 |
| JP | 2006-203720 | 8/2006 |
| JP | 2006317757 | 11/2006 |
| JP | 2007093990 | 4/2007 |
| JP | 2007212628 | 8/2007 |
| JP | 2007272023 | 10/2007 |
| JP | 2007299001 | 11/2007 |
| JP | 2008-067473 | 3/2008 |
| JP | 2009109876 | 5/2009 |
| WO | WO02099557 | 12/2002 |
| WO | WO2004075155 | 9/2004 |
| WO | WO2005029459 | 3/2005 |
| WO | WO03039137 | 5/2006 |

OTHER PUBLICATIONS

U.S. Appl. No. 11/293,066—Final Office Action dated Oct. 1, 2010.
U.S. Appl. No. 11/460,768—Non-Final Office Action dated Sep. 3, 2010.
U.S. Appl. No. 11/680,312—Non-Final Office Action dated Sep. 9, 2010.
U.S. Appl. No. 11/948,969—Non-Final Office Action dated Oct. 4, 2010.
U.S. Appl. No. 11/154,054—Final Office Action dated Aug. 9, 2010.
U.S. Appl. No. 11/293,562—Final Office Action dated Jul. 8, 2010.
U.S. Appl. No. 11/371,466—Notice of Allowance dated Jul. 13, 2010.
U.S. Appl. No. 11/460,907—Non-Final Office Action dated Aug. 30, 2010.
International Application No. PCT/US05/043560 International Search Report.
International Application No. PCT/US05/043560 International Preliminary Examination Report.
International Application No. PCT/US05/043641 International Search Report.
International Application No. PCT/US05/043641 International Preliminary Examination Report.
International Application No. PCT/US05/043647 International Search Report.
International Application No. PCT/US05/043647 International Preliminary Examination Report.
International Application No. PCT/US05/043640 International Search Report.
International Application No. PCT/US05/043640 International Preliminary Examination Report.
International Application No. PCT/US05/043646 International Preliminary Examination Report.
International Application No. PCT/US05/043646 International Search Report.
U.S. Appl. No. 11/154,054—Office Action dated Mar. 25, 2008.
U.S. Appl. No. 11/293,066—Office Action dated Jan. 15, 2008.
U.S. Appl. No. 11/371,466—Office Action dated Oct. 5, 2007.
U.S. Appl. No. 11/371,466—Office Action dated Apr. 11, 2008.
Wei-Chung Cheng and Massoud Pedram, "Power Minimization in a Backlit TFT-LCD Display by Concurrent Brightness and Contrast Scaling" IEEE Transactions on Consumer Electronics, Vo. 50, No. 1, Feb. 2004.
Insun Hwang, Cheol Woo Park, Sung Chul Kang and Dong Sik Sakong, "Image Synchronized Brightness Control" SID Symposium Digest 32, 492 (2001).
Inseok Choi, Hojun Shim and Naehyuck Chang, "Low-Power Color TFT LCD Display for Hand-Held Embedded Systems", In ISLPED, 2002.
A. Iranli, H. Fatemi, and M. Pedram, "HEBS: Histogram equalization for backlight scaling," Proc. of Design Automation and Test in Europe, Mar. 2005, pp. 346-351.
Chang, N., Choi, I., and Shim, H. 2004. DLS: dynamic backlight luminance scaling of liquid crystal display. IEEE Trans. Very Large Scale Integr. Syst. 12, 8 (Aug. 2004), 837-846.
S. Pasricha, M Luthra, S. Mohapatra, N. Dutt, N. Venkatasubramanian, "Dynamic Backlight Adaptation for Low Power Handheld Devices," To appear in IEEE Design and Test (IEEE D&T), Special Issue on Embedded Systems for Real Time Embedded Systems, Sep. 8, 2004.
H. Shim, N. Chang, and M. Pedram, "A backlight power management framework for the battery-operated multi-media systems." IEEE Design and Test Magazine, Sep./Oct. 2004, pp. 388-396.
F. Gatti, A. Acquaviva, L. Benini, B. Ricco', "Low-Power Control Techniques for TFT LCD Displays," Compiler, Architectures and Synthesis of Embedded Systems, Oct. 2002.
Ki-Duk Kim, Sung-Ho Baik, Min-Ho Sohn, Jae-Kyung Yoon, Eui-Yeol Oh and In-Jae Chung, "Adaptive Dynamic Image Control for IPS-Mode LCD TV", SID Symposium Digest 35, 1548 (2004).
Raman and Hekstra, "Content Based Contrast Enhancement for Liquid Crystal Displays with Backlight Modulation", IEEE Transactions on Consumer Electronics, vol. 51, No. 1, Feb. 2005.
E.Y. Oh, S. H. Balik, M. H. Sohn, K. D. Kim, H. J. Hong, J.Y. Bang, K.J. Kwon, M.H. Kim, H. Jang, J.K. Yoon and I.J. Chung, "IPS-mode dynamic LCD-TV realization with low black luminance and high contrast by adaptive dynamic image control technology", Journal of the Society for Information Display, Mar. 2005, vol. 13, Issue 3, pp. 181-266.
Fabritus, Grigore, Muang, Loukusa, Mikkonen, "Towards energy aware system design", Online via Nokia (http://www.nokia.com/nokia/0,,53712,00.html).

Choi, I., Kim, H.S., Shin, H. and Chang, N. "LPBP: Low-power basis profile of the Java 2 micro edition" In Proceedings of the 2003 International Symposium on Low Power Electronics and Design (Seoul, Korea, Aug. 2003) ISLPED '03. ACM Press, New York, NY, p. 36-39.

A. Iranli, W. Lee, and M. Pedram, "HVS-Aware Dynamic Backlight Scaling in TFT LCD's", Very Large Scale Integration (VLSI) Systems, IEEE Transactions vol. 14 No. 10 pp. 1103-1116, 2006.

L. Kerofsky and S. Daly "Brightness preservation for LCD backlight reduction" SID Symposium Digest vol. 37, 1242-1245 (2006).

L. Kerofsky and S. Daly "Addressing Color in brightness preservation for LCD backlight reduction" ADEAC 2006 pp. 159-162.

L. Kerofsky "LCD Backlight Selection through Distortion Minimization", IDW 2007 pp. 315-318.

International Application No. PCT/JP08/053895 International Search Report.

U.S. Appl. No. 11/154,054—Office Action dated Aug. 5, 2008.
U.S. Appl. No. 11/460,940—Office Action dated Aug. 7, 2008.
International Application No. PCT/JP08/064669 International Search Report.

Richard J. Qian, et al, "Image Retrieval Using Blob Histograms", Proceeding of 2000 IEEE International Conference on Multimedia and Expo, vol. 1, Aug. 2, 2000, pp. 125-128.

U.S. Appl. No. 11/154,054—Office Action dated Dec. 30, 2008.
U.S. Appl. No. 11/154,053—Office Action dated Oct. 1, 2008.
U.S. Appl. No. 11/460,940—Notice of Allowance dated Dec. 15, 2008.
U.S.Appl. No. 11/202,903—Office Action dated Oct. 3, 2008.
U.S. Appl. No. 11/224,792—Office Action dated Nov. 10, 2008.
U.S. Appl. No. 11/371,466—Office Action dated Sep. 23, 2008.
PCT App. No. PCT/JP2008/064669—Invitation to Pay Additional Fees dated Sep. 29, 2008.
PCT App. No. PCT/JP2008/069815—Invitation to Pay Additional Fees dated Dec. 5, 2005.
International Application No. PCT/JP08/069815 International Search Report.
International Application No. PCT/JP08/072215 International Search Report.
International Application No. PCT/JP08/073898 International Search Report.
International Application No. PCT/JP08/073146 International Search Report.
International Application No. PCT/JP08/072715 International Search Report.
International Application No. PCT/JP08/073020 International Search Report.
International Application No. PCT/JP08/072001 International Search Report.
International Application No. PCT/JP04/013856 International Search Report.
PCT App. No. PCT/JP08/071909—Invitation to Pay Additional Fees dated Jan. 13, 2009.
U.S. Appl. No. 11/154,052—Office Action dated Apr. 27, 2009.
U.S. Appl. No. 11/154,053—Office Action dated Jan. 26, 2009.
U.S. Appl. No. 11/202,903—Office Action dated Feb. 5, 2009.
U.S. Appl. No. 11/224,792—Office Action dated Apr. 15, 2009.
U.S. Appl. No. 11/293,066—Office Action dated May 16, 2008.
U.S. Appl. No. 11/371,466—Office Action dated Apr. 14, 2009.
International Application No. PCT/JP08/071909 International Search Report.
PCT App. No. PCT/JP08/073020—Replacement Letter dated Apr. 21, 2009.
U.S. Appl. No. 11/564,203—Non-final Office Action dated Sep. 24, 2009.
U.S. Appl. No. 11/154,052—Non-final Office Action dated Nov. 10, 2009.
U.S. Appl. No. 11/154,054—Final Office Action dated Jun. 24, 2009.
U.S. Appl. No. 11/154,053—Non-final Office Action dated Jul. 23, 2009.
U.S. Appl. No. 11/202,903—Non-final Office Action dated Aug. 7, 2009.
U.S. Appl. No. 11/202,903—Final Office Action dated Dec. 28, 2009.
U.S. Appl. No. 11/224,792—Non-final Office Action dated Nov. 18, 2009.
U.S. Appl. No. 11/371,466—Non-final Office Action dated Dec. 14, 2009.
U.S. Appl. No. 11/154,054—Non-final Office Action dated Jan. 7, 2009.
U.S. Appl. No. 11/293,562—Non-final Office Action dated Jan. 7, 2009.
U.S. Appl. No. 11/564,203—Notice of Allowance dated Apr. 2, 2010.
U.S. Appl. No. 11/154,052—Notice of Allowance dated May 21, 2010.
U.S. Appl. No. 11/154,053—Final Office Action dated Mar. 4, 2010.
U.S. Appl. No. 11/293,066—Non-Final Office Action dated Mar. 2, 2010.
U.S. Appl. No. 11/465,436—Notice of Allowance dated Apr. 20, 2010.
U.S. Appl. No. 11/680,539—Non-Final Office Action dated May 19, 2010.
U.S. Appl. No. 11/224,792—Final Office Action dated Jun. 11, 2010.
Rafal Mantiuk, Scott Daly, Louis Kerofsky, "Display Adaptive Tone Mapping", ACM Transactions on Graphics, Aug. 2008, vol. 27, No. 3, Article 68.
Pierre De Greef and Hendriek Groot Hulze NXP Semiconductors (Founded by Philips) et al: "39.1: Adaptive Dimming and Boosting Backlight for LCD-TV Systems", SID 2007, 2007 SID International Symposium, Society for Information Display, Los Angeles, USA, vol. XXXVIII, May 20, 2007, pp. 1332-1335, XP007013259, ISSN: 0007-966X.
International Application No. PCT/JP2010/064123 International Search Report.
International Application No. PCT/JP2008/072215 European Search Report.
International Application No. PCT/JP2008/0723020 European Search Report.
International Application No. PCT/JP2008/069815 European Search Report.
U.S. Appl. No. 11/293,562—Notice of Allowance dated Dec. 8, 2010.
U.S. Appl. No. 11/224,792—Notice of Allowance dated Feb. 9, 2011.
U.S. Appl. No. 11/964,683—Non-final Office Action dated Dec. 28, 2010.
U.S. Appl. No. 11/154,053—Non-final Office Action dated Mar. 1, 2011.
U.S. Appl. No. 11/202,903—Non-final Office Action dated Mar. 1, 2011.
U.S. Appl. No. 11/964,691—Non-final Office Action dated Mar. 3, 2011.

* cited by examiner

METHODS AND SYSTEMS FOR POWER-CONTROLLING DISPLAY DEVICES

FIELD OF THE INVENTION

Embodiments of the present invention comprise methods and systems for management and control of power consuming devices with a display device, which is capable of receiving power rate and cost data as well as user preference input. These methods and systems may generate device power consumption schedules based on power rate and cost data and user preference data.

BACKGROUND

Electric power suppliers are burdened with the need to meet extreme peak demands that are many times the average power demand. The requirement of meeting peak electricity demand drives the need for a large portion of power generation capacity. For this reason, shaving or reducing peak demand is of utmost interest to utility providers and energy managers. Peak demand can be mitigated by reducing demand through more efficient use of electricity by consumers during peak demand periods. Peak demand may also be mitigated by time-shifting electricity usage from a peak demand period to an off-peak period.

Early efforts to mitigate peak demand include time or use pricing in which electricity prices are variable based on the time of use or the type of use. Electricity rates that vary based on the time of usage are now common in many areas. Electricity rates that vary based on the type of use, such as business use, residential use, agricultural use, etc., are also common. These type-of-use scenarios are typically implemented by using individual power meters and accounts for specific applications, such as a business location, an irrigation pump or a residential home.

Recent advances in electric power distribution provide the ability for a power distribution network to send data to end-user equipment to help mitigate peak demands. This data may include power pricing data such as current electricity rates. A local user may use this rate data to schedule electricity usage events to take advantage of lower rates. These systems use the market system and the price of power to incentivize to use of power at off-peak times and discourage use during peak demand periods.

SUMMARY

Some embodiments of the present invention comprise methods and systems for using data from a power provider, such as rate or pricing data, to manage power consumption. Some embodiments may automatically adjust usage parameters based on data received from a power provider. Some embodiments may regulate a display device backlight and process image data for the display in response to data received from a power provider. Some embodiments comprise a television or image display device with an interactive interface that displays power provider data to a user and accepts user input for designating power consumption parameters related to the power provider data. Some embodiments may control a plurality of power consuming devices. Some embodiments may also receive television programming data and manage television power consumption in relation to programming content.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
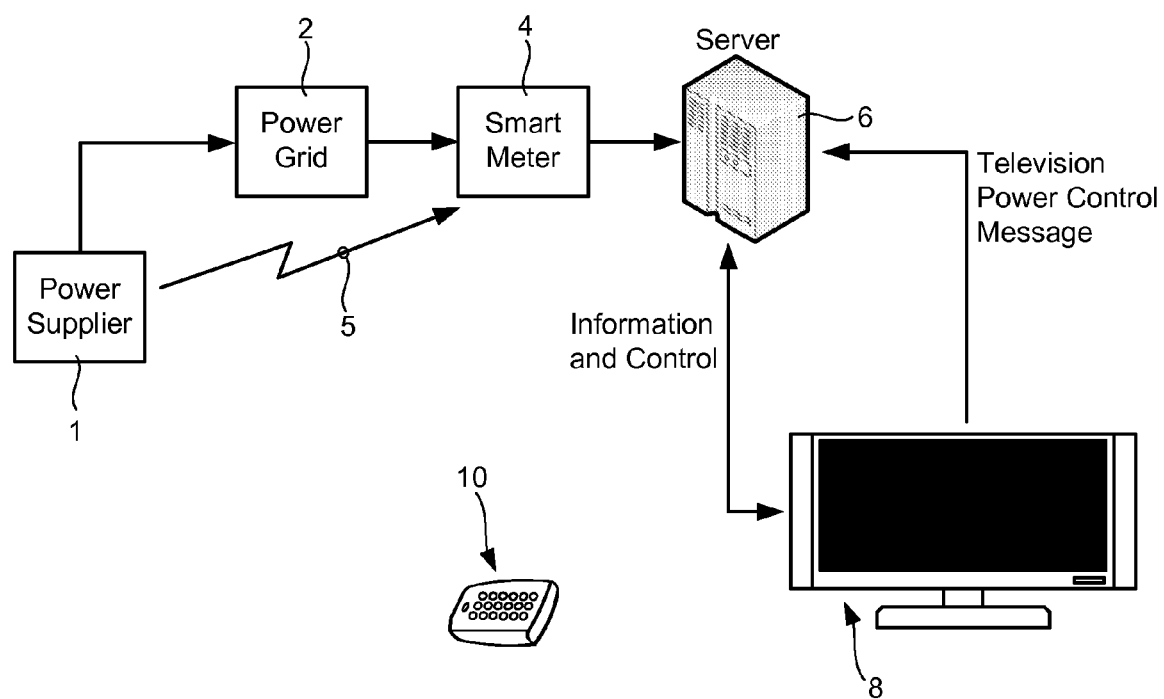
FIG. 1 is a diagram showing an embodiment of the present invention comprising a smart meter, a power management server and a smart television.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention may comprise elements that are described in the following pending or issued patent applications, which are hereby incorporated herein by reference.

U.S. patent application Ser. No. 11/154,052, entitled "Methods and Systems for Enhancing Display Characteristics," filed on Jun. 15, 2005, published as U.S. publication No. 2006-0284822 on Dec. 21, 2006

U.S. patent application Ser. No. 11/154,053, entitled "Methods and Systems for Enhancing Display Characteristics with High-Frequency Contrast Enhancement," filed on Jun. 15, 2005, published as U.S. publication No. 2006-0284882 on Dec. 21, 2006

U.S. patent application Ser. No. 11/154,054, entitled "Methods and Systems for Enhancing Display Characteristics with Frequency-Specific Gain," filed on Jun. 15, 2005, published as U.S. publication No. 2006-0284823 on Dec. 21, 2006

U.S. patent application Ser. No. 11/224,792, entitled "Methods and Systems for Image-Specific Tone Scale Adjustment and Light-Source Control," filed on Sep. 12, 2005, published as U.S. publication No. 2006-0119612 on Jun. 8, 2006

U.S. patent application Ser. No. 11/202,903, entitled "Methods and Systems for Independent View Adjustment in Multiple-View Displays," filed on Aug. 8, 2005, published as U.S. publication No. 2007-0035565 on Feb. 15, 2007

U.S. patent application Ser. No. 11/371,466, entitled "Methods and Systems for Enhancing Display Characteristics with Ambient Illumination Input," filed on Mar. 8, 2006, published as U.S. publication No. 2007-0211049 on Sep. 13, 2007

U.S. patent application Ser. No. 11/293,562, entitled "Methods and Systems for Determining a Display Light Source Adjustment," filed on Dec. 2, 2005, published as U.S. publication No. 2006-0209003 on Sep. 21, 2006

U.S. patent application Ser. No. 11/293,066, entitled "Methods and Systems for Display Mode Dependent Brightness Preservation," filed on Dec. 2, 2005, published as U.S. publication No. 2006-0119613 on Jun. 8, 2006

U.S. patent application Ser. No. 11/460,768, entitled "Methods and Systems for Distortion-Related Source Light Management," filed on Jul. 28, 2006, published as U.S. publication No. 2006-0262111 on Nov. 1, 2007

U.S. patent application Ser. No. 11/460,907, entitled "Methods and Systems for Generating and Applying Image Tone Scale Corrections," filed on Jul. 28, 2006, published as U.S. publication No. 2006-0267923 on Nov. 30, 2006

U.S. patent application Ser. No. 11/460,940, entitled "Methods and Systems for Color Preservation with Image Tonescale Corrections," filed on Jul. 28, 2006, published as U.S. publication No. 2008-0024517 on Jan. 31, 2008, issued as U.S. Pat. No. 7,515,160 on Apr. 7, 2009

U.S. patent application Ser. No. 11/465,436, entitled "Methods and Systems for Selecting a Display Source Light Illumination Level," filed on Aug. 17, 2006, published as U.S. publication No. 2006-0274026 on Dec. 7, 2006

U.S. patent application Ser. No. 11/564,203, entitled "Methods and Systems for Image Tonescale Adjustment to Compensate for a Reduced Source Light Power Level," filed on Nov. 28, 2006, published as U.S. publication No. 2007-0092139 on Apr. 26, 2007

U.S. patent application Ser. No. 11/680,312, entitled "Methods and Systems for Brightness Preservation Using a Smoothed Gain Image," filed on Feb. 28, 2007, published as U.S. publication No. 2007-0146236 on Jun. 28, 2007

U.S. patent application Ser. No. 11/680,539, entitled "Methods and Systems for Surround-Specific Display Modeling," filed on Feb. 28, 2007, published as U.S. publication No. 2008-0208551 on Aug. 28, 2008

U.S. patent application Ser. No. 11/845,651, entitled "Methods and Systems for Tone Curve Generation, Selection and Application," filed on Aug. 27, 2007, published as U.S. publication No. 2007-0291048 on Dec. 20, 2007

U.S. patent application Ser. No. 11/929,796, entitled "Methods and Systems for Backlight Modulation and Brightness Preservation," filed on Oct. 30, 2007, published as U.S. publication No. 2009-0109232 on Apr. 30, 2009

U.S. patent application Ser. No. 11/929,918, entitled "Methods and Systems for Image Enhancement," filed on Oct. 30, 2007, published as U.S. publication No. 2009-0109233 on Apr. 30, 2009

U.S. patent application Ser. No. 11/948,969, entitled "Methods and Systems for Weighted-Error-Vector-Based Source Light Selection," filed on Nov. 30, 2007, published as U.S. publication No. 2009-0140970 on Jun. 4, 2009

U.S. patent application Ser. No. 11/948,978, entitled "Methods and Systems for Backlight Modulation with Scene-Cut Detection," filed on Nov. 30, 2007, published as U.S. publication No. 2009-0141178 on Jun. 4, 2009

U.S. patent application Ser. No. 11/964,674, entitled "Methods and Systems for Display Source Light Illumination Level Selection," filed on Dec. 26, 2007

U.S. patent application Ser. No. 11/964,683, entitled "Methods and Systems for Backlight Modulation with Image Characteristic Mapping," filed on Dec. 26, 2007

U.S. patent application Ser. No. 11/964,689, entitled "Methods and Systems for Display Source Light Management with Histogram Manipulation," filed on Dec. 26, 2007

U.S. patent application Ser. No. 11/964,691, entitled "Methods and Systems for Image Tonescale Design," filed on Dec. 26, 2007

U.S. patent application Ser. No. 11/964,695, entitled "Methods and Systems for Display Source Light Management with Variable Delay," filed on Dec. 26, 2007

U.S. patent application Ser. No. 12/111,113, entitled "Methods and Systems for Image Compensation for Ambient Conditions," filed on Apr. 28, 2008

U.S. patent application Ser. No. 12/202,243, entitled "Methods and Systems for Display Source Light Management with Rate Change Control," filed on Aug. 30, 2008

Some embodiments of the present invention may comprise a television connected to a smart meter. A television has several distinct aspects compared to a generic home appliance. Among these are: the ability to display information to a user, power/quality scalability, widely varied power consumption depending upon video content being displayed, and a limited ability to time shift its use. These distinct aspects both limit the conventional load time shift approaches to peak shaving power reduction and provide additional approaches to peak shaving.

In some embodiments, a television can be used to display information from a smart meter regarding power grid alerts, current and price history and usage statistics. A television or display of some embodiments may be used with remote modules connected to electrical sockets or other appliances. These remote modules may report back to the master display device regarding energy consumption of the devices to which they are connected. The master display device, which may also have processing capacity, may then adjust performance parameters for the devices attached to the remote reporting modules. These adjustments can help reduce energy use and/or change device performance. In some embodiments, remote modules may measure how much energy a single product or a group of products uses, and then send the data to a computer for analysis. In some embodiments, the computer may be part of the master display device or may be a separate computer that is networked with a master display device. In an exemplary embodiment, a remote module can help determine how much it costs to run a refrigerator. In some embodiments, a remote module can also determine how much energy your television or computer uses in Sleep mode—information that just might cause you to shut those products off more often." The master display device can display this information and provide signals back to a server to help a consumer make informed energy use decisions.

In some embodiments, a display device, such as a smart television, may be equipped with a power control algorithm, which may limit the average power use independent of display content. In some embodiments, there may be two interacting aspects involved in this process.

First, determining a power target in terms of a bound on average power based upon the state of a power grid or power cost factors, which may be supplied by a power provider or another party. This determination may take place on a server having access to both power rate data and the television. This determination may also take place on a smart television with processing capabilities and access to the power rate data.

Second, one or more algorithms which guarantee this power target is met while providing minimal impact to the viewer. To meet a power consumption target, the television can gracefully degrade image brightness, quality or size as power is reduced. In some embodiments, this power consumption adjustment may be achieved by adjusting the display backlight brightness. This simple method degrades brightness in exchange for power. Some embodiments of the present invention may use more advanced cost functions for deciding how much brightness or other image aspects, such as highlight detail, to reduce in exchange for a power reduction. In some embodiments, parameters considered in this decision may comprise the properties of the display, the image content, and the viewing conditions (e.g., ambient lighting).

The systems and methods of some embodiments of the present invention may be described with reference to FIG. 1. These embodiments may receive power from a power supplier 1, such as a utility company, which distributes power over a transmission medium 2, such as a power grid. These embodiments may comprise a smart meter 4, which may be connected to the incoming power transmission medium 2 so as to measure current, voltage and other aspects of the power as it is supplied to a home, business or other entity. The smart meter 4 may also be in communication with a power supplier 1 and may receive power rate or cost data from the power supplier 1 over a communication link 5, such as a wireless network connection, a cellular phone connection, a radio connection, a telephone connection, a wired communication connection or some other communication connection suitable for transmitting data between computing devices.

The smart meter 4 may also be connected to power management server 6, which may comprise only simple communication and computing resources or more extensive resources, such as multiple processors and storage devices. The power management server 6 may also be in communication with a smart television or display device 8. In some embodiments, the power management server 6 may communicate power usage and power rate data to the television 8. In some embodiments, the power management server 6 may communicate a power control signal to the television or display 8. This power control signal may serve to regulate the backlight and/or other parameters of the display 8 to regulate power consumption. In response to the regulation of the backlight and other parameters, the television or display 8 may modify displayed content to compensate for a reduced backlight level or some other adjustment. Many methods for modification of displayed image content are described in the patent applications that are incorporated herein by reference at the beginning of this detailed description.

In some embodiments, the electric utility 1 may communicate power grid events and real-time pricing information to the smart meter 4. The smart meter 4 may communicate this information to the power management server 6. The power management server 6 may then send information to the television 8 to perform different tasks. For example, in some embodiments, the power management server 6 may send data for displaying messages or information on the television such as for enabling the user to make power management decisions and selections. The power management server 6 may also send data to the television for managing television power consumption. For power management purposes, the television 8 may respond automatically to commands from the power management server 6 to reduce power consumption. In some cases, these responses may come at the expense of image brightness and/or image quality. However, in some cases, the power management server 6 or the television 8 may compensate the displayed image to compensate for a reduced power level. This compensation may result in an image being displayed at a reduced power level, but which is not perceptibly different than an image displayed at full power settings.

It should be noted that, in some embodiments, smart meter 4, power management server 6 and television or display 8 may be integrated into one or more devices that perform all the functions of the separate devices. In some embodiments, a remote control 10 may also be used to perform typical television control functions as well as to receive user input relative to power consumption options that may be displayed on the television 8. In some embodiments, a remote control device 10 may also communicate with smart meter 4 and/or power management server 6. A remote control 10 or embodiments of the present invention may communicate using wireless RF signals, wireless infrared signals, wired communication processes or by other communication methods.

Figure 2:
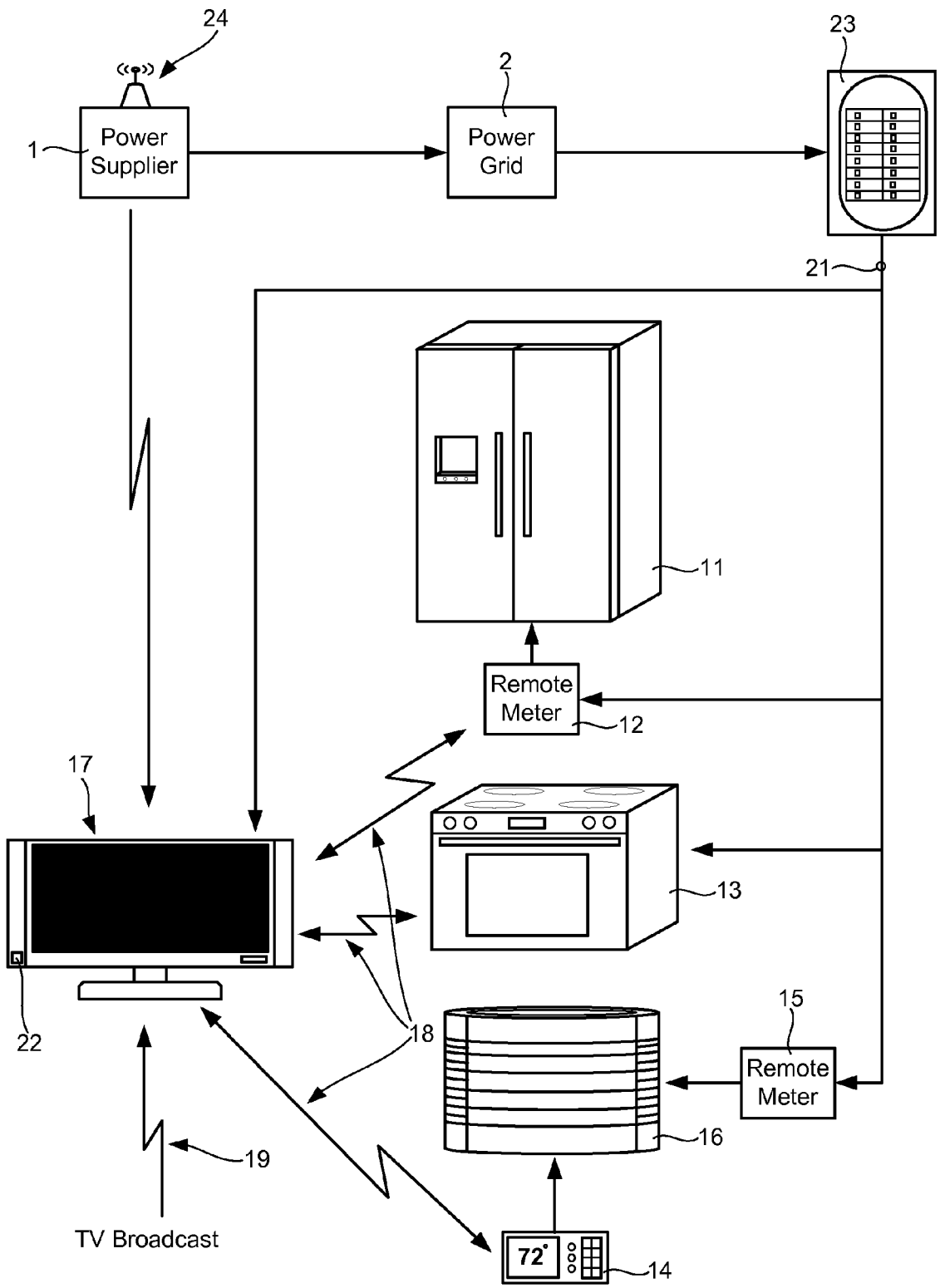
FIG. 2 is a diagram showing an embodiment of the present invention comprising a master power control display device and connected power consuming devices.

Some embodiments of the present invention may be described with reference to FIG. 2. In these embodiments, power is provided by a power provider, such as a utility company 1 through an electrical transmission grid 2 to a point of entry 23 into a metered use area, such a residence or business location. A point of entry may comprise an electrical meter or shut-off switch, however, in these embodiments, the meter or point of entry does not need to communicate or process information. Beyond the meter or point of entry 23, private transmission lines, such as electrical wiring 21, typically carry power to various appliances and end uses, such as a refrigerator 11, air conditioning unit 16, oven 13, television 17 and other devices.

In some embodiments, this electrical wiring 21 may terminate in a power monitoring unit (PMU), which may reside in an appliance, such as television 17 or oven 13. A PMU may also reside in an electrical receptacle 12, an electrical junction box or breaker box 15. A PMU may also reside in a thermostat 14 or some other form of remote control device. A PMU may measure electrical attributes related to the current, voltage, phase and/or other electrical attributes for the device to which the PMU is connected. In some embodiments, a PMU may also calculate values, such as power, energy and other values related to electricity use or consumption.

In some embodiments, attributes measured by the PMU and any values calculated by the PMU may be transmitted to a Master Power Control and Display Device (MPCDD) 17, which may comprise a television tuner 22. The MPCDD 17 may receive data from the PMUs and process that data to determine power consumption characteristics of each device

11, 13, 15 as well as cumulative characteristics and global characteristics for a group of devices. In some embodiments, an MPCDD 17 may also determine energy usage and consumption characteristics for one or more parts of the MPCDD 17, such as the television display components (e.g., backlight, pixel arrays, etc.), audio components or other parts of the device. In some embodiments, an MPCDD 17 may generate and transmit power control messages to connected PMUs thereby controlling the power consumption of the attached devices 11, 13, 15, 17.

In some embodiments, an MPCDD 17 may receive power rate and cost data from a power supplier, such as a utility company. In some embodiments, power rate and cost data may be received via a data communication network, such as a wireless network. For example, an MPCDD 17 may comprise a wireless network interface controller, which interfaces using the IEEE 802.11 standard, a Bluetooth standard or some other wireless network standard and associated protocols. In some embodiments, an MPCDD 17 may comprise a wired network controller or modem and communicate with a power supplier using a wired network standard and protocol over a wired network or phone line.

In some embodiments, an MPCDD 17 may receive power rate and cost data via a television channel by receiving a signal 19 through a television tuner 22. In these embodiments, a television broadcast may comprise power rate and cost data and may include various times for rate changes. The power rate and cost data may be used by the MPCDD 17 to determine power management parameters for regulating any devices connected through PMUs. An MPCDD 17, may user power rate and cost data to determine a power consumption schedule that may limit device power consumption for specific periods. In some embodiments, the timing of the power rate changes may be used to schedule efficient consumption. In an exemplary power consumption schedule, heating and/or cooling devices, such as refrigerator 11 and AC unit 16 may be scheduled or programmed to cool below a normal thermostatically-controlled level during a period just prior to a power rate increase so as to use less energy during the increased rate period. Similarly, a cooling device 11, 16 may be scheduled or programmed to allow a higher than normal thermostatically-controlled level during a period just prior to a rate decrease so as to delay significant cooling until after the rate decrease.

Similarly, for heating devices, an exemplary power consumption schedule may cause heating devices to heat to a level above a thermostatically-controlled level for a period just prior to a power rate increase and may cause heating devices to delay heating to a thermostatically-controlled level for a period just prior to a power rate decrease so as to delay a significant amount of heating until after the rate decrease.

In some embodiments, an MPCDD 17 may communicate directly with a thermostat, such as thermostat 14, to control a thermostatically-controlled device. In other embodiments, an MPCDD 17 may communicate directly with devices, such as AC unit 16, refrigerator 11 and oven 13 to control those devices.

In some embodiments, an MPCDD 17 may receive a power rate and cost data via an RF television frequency broadcast. In some embodiments, an MPCDD 17 may receive power rate and cost data via a cable television connection. In some embodiments, a power supplier or utility 1 may broadcast 24 power rate and cost data at specific intervals or in real time. In some embodiments, a power supplier 1 may broadcast or transmit a signal with data that identifies the power supplier, the times of any rate changes and the rates that apply for each time period. In some cases, rates may be identified for different classes of users (e.g., business or residential) or different usage or consumption categories such as when rates change based on the quantity of energy used. In some cases, specific instructions may be generated for peak demand periods.

In some embodiments, power rate and cost data from the power supplier may comprise commands that are recognizable to the MPCDD 17 that may cause the MPCDD 17 to control specific devices under control of the MPCDD 17. For example, a user may set preferences in his/her MPCDD 17 to allow a power supplier to control specific devices via a signal received by the MPCDD 17 from the power supplier. In some cases, the power supplier may direct an MPCDD 17 to shut down specific devices during a peak demand period. In some cases, a power supplier may direct an MPCDD 17 to adjust settings on specific devices, such as adjusting a temperature setting on a thermostat during specific periods (e.g., during a peak demand period). In some cases, a user may program an MPCDD 17 to prevent or adjust all or some of the commands from the power supplier.

In some embodiments, an MPCDD 17 may use power rate and cost data, derived from the television signal, to generate a power schedule for various devices in communication with the MPCDD 17. An MPCDD 17 may also display information derived from the power supplier's power rate and cost data to a user and prompt for user input to acquire user preferences. User preference data may be specific to each device, each group of devices or global preferences for all devices controlled by an MPCDD 17. User preference data may also comprise instructions that are conditional in relation to power cost at a specific time. For example, a user may select preferences that instruct the MPCDD 17 to activate specific devices only when the power cost is below a specified level. A user may also specify preferences indicating that specific devices may not be activated during peak demand periods identified in the power rate and cost data received from the power supplier 1.

In some embodiments, an MPCDD 17 may also receive television programming content via a television channel or other communication link. An MPCDD 17 may also receive user preference input relative to the television programming content and the power cost data. An MPCDD 17 may then use the user preference input, the power rate and cost data and the television programming schedule to generate a power consumption schedule, which may comprise a power budget that is responsive to a user's preferred television programming. For example, an exemplary power consumption schedule may automatically adjust the power consumption of other devices so that a television may operate at full power during preferred programming that occurs during a peak demand or power budget period.

Figure 3:
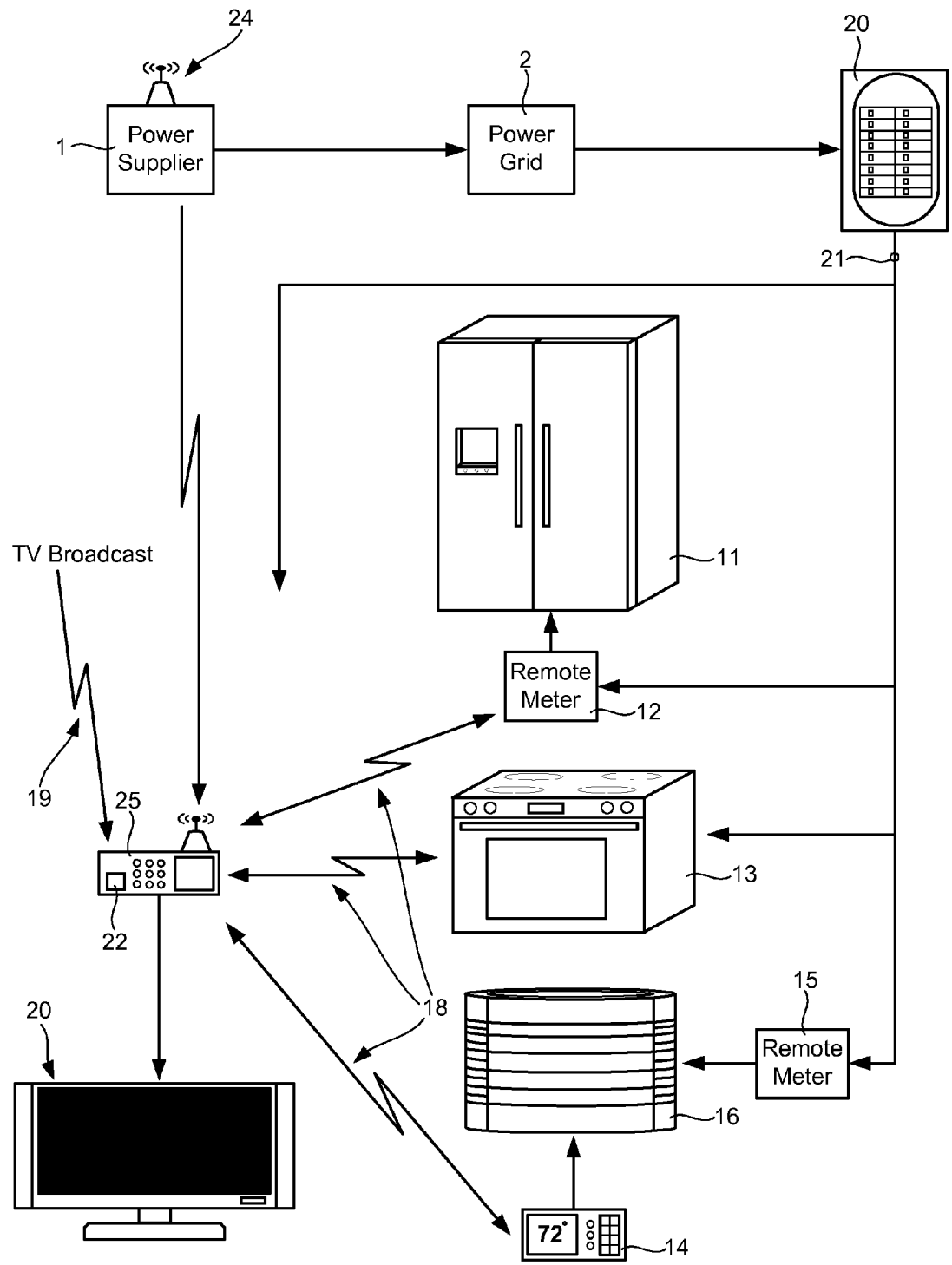
FIG. 3 is a diagram showing an embodiment of the present invention comprising a master power control set-top box, a television and connected power consuming devices.

Some embodiments of the present invention may be described with reference to FIG. 3. These embodiments comprise a master power control set-top box (MPCSTB) 25, which may receive and transmit signals 18 to PMUs and other power-controlled devices. An MPCSTB 25 may also communicate via a television signal 19, such as a television broadcast channel, a cable television signal or some other analog or digital television broadcast medium. An MPCSTB 25 is also typically connected to a display device, such as a television 20. An MPCSTB 25 may also comprise a television tuner 22.

In some embodiments, an MPCSTB 25 performs essentially the same functions as an MPCDD 17 or a PCDD 56 (described below) except the communication and processing functions are housed in a set-top box rather than being integral with the display device. An MPCSTB 25 may receive power rate and cost data, which may comprise a power cost schedule, from a power supplier. This power rate and cost data may be received directly from a power supplier, via a television broadcast or by other methods. This data may then be displayed to a user on a connected display 20, which may be a power-controlled display device with power control and image compensation components. In some embodiments, an MPCSTB 25 may comprise image compensation components (as explained below and in patent applications incorporated by reference) and the display 20 may only comprise a backlight control interface that may be accessed by the MPCSTB 25.

Display with Internal Power Management

In some embodiments of the present invention, a television or display device may comprise internal power management functions as well as power-related messaging display functions, which may relate to power consumption of the display device or other devices in communication with the display device. In some embodiments, the display device may comprise an MPCDD 17.

In some embodiments, the television or display may provide the ability to display information to a consumer as well as the ability for a user to provide feedback to the system via the television user interface or remote control. These features may be independent of regulating television power consumption.

In some embodiments, the television or display device can display several types of information relevant to power consumption:

Recent and current state of power grid

Current and historical price of electricity

Alert messages from the power grid operator/power supplier

Power consumption information from the home server or MPCDD 17 such as status and schedule of appliances in home The user can interact with the power management process of the home server using the television remote control as an input device and the display for visual feedback. Exemplary actions enabled through display or television controls comprise:

Setting device priorities in power management system

Overriding system power control decisions

Figure 4:
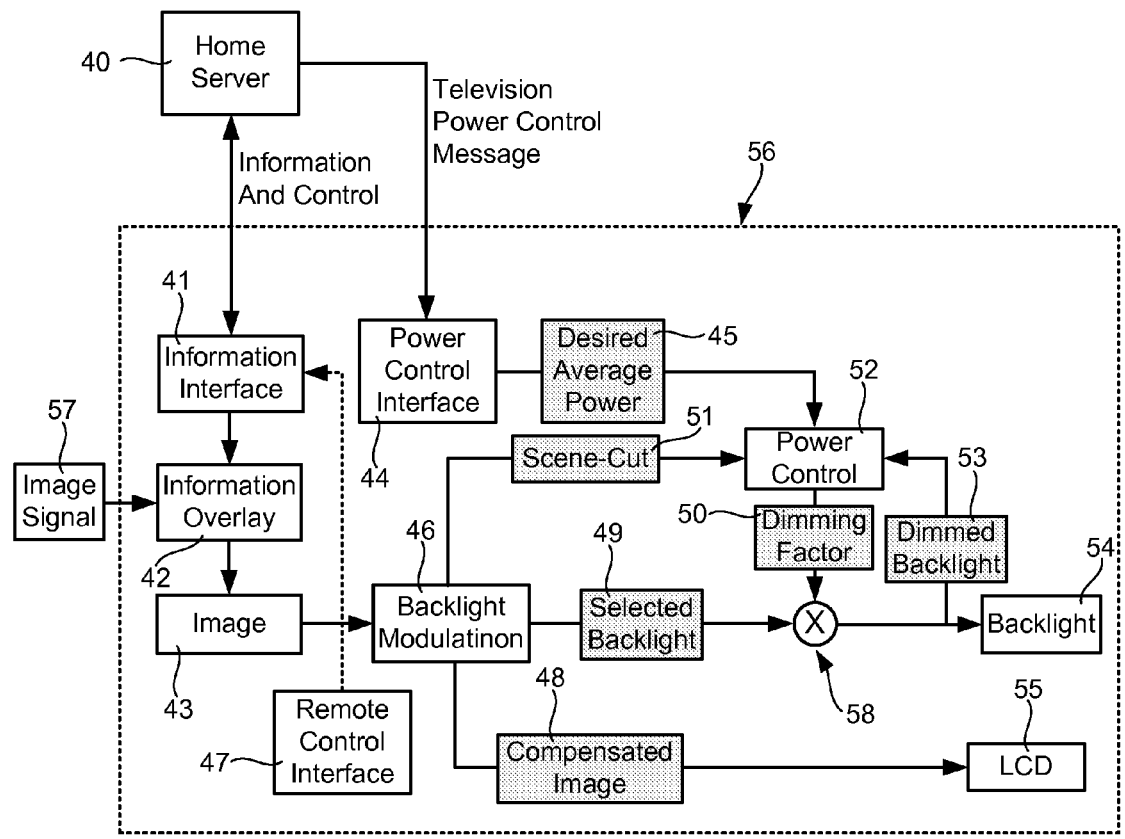
FIG. 4 is a diagram showing an embodiment of the present invention comprising a power-controlled display device.

Some embodiments of the present invention may be described with reference to FIG. 4. These embodiments comprise a power-controllable display device (PCDD) 56 in which the power consumption of the display itself may be internally adjusted or varied in response to power rate and cost data as well as display content and other parameters.

In some embodiments, a PCDD 56 may be connected to a power control server 40, which may receive power rate and cost data via various communication networks, such as a wireless network connection, a wired network connection, a telephone line, a powerline network connection, an RF connection, an IR connection, a television channel or other communication connections. In some embodiments, a power control server 40 may be an integral element of the PCDD 56. In some embodiments, the power control server 40 may process power rate and cost data as well as user preference data and may generate control data for controlling elements of the PCDD, such as backlight and pixel values and/or for controlling other devices such as any devices with PMUs or other control-enabling devices. In some embodiments these processing functions may be performed by processing elements in a PCDD 56 or MPCDD 17.

In some embodiments, a PCDD 56 may also comprise an information interface 41 for receiving information to be displayed on the PCDD 56 display. This information may be received from the power control server 40, from a remote control interface 47, from other elements of the PCDD (e.g., manual controls on TV, ambient sensors, display content), from PMUs or from other input elements. An information interface 41 may process and format data for display on the PCDD 56 display for consumption by users. Information received or generated at the information interface 41 may then be sent to an information overlay module 41, where the information may be formatted for direct display without a background image or for integration with another image. In some embodiments, the information overlay module 42 may also receive image data 57 which defines an image to be combined with the information overlay. The information-modified image 43, which may comprise information overlay data may then be sent to a backlight modulation module 46 for modification related to backlight changes.

Some embodiments may comprise a remote control interface 47 for receiving user input from a user. In some embodiments, information may be displayed on the display of the PCDD 56 to prompt input from a user. In an exemplary embodiment, a PCDD 56 may prompt for user preferences related to power consumption, television or display content, power rate and cost data and other factors. Input received from the user via the remote control interface 47 may be forwarded to the information interface 41 and on to the power control server 40, an equivalent component in the PCDD and/or other PCDD 56 components.

Embodiments of the present invention may also comprise a power control interface 44 for receiving power control messages or commands from a power control server 40 or an equivalent internal component of the PCDD 56. A power control interface 44 may receive a power control command and interpret or process that command into a control signal for controlling the power consumption of the PCDD 56. In some embodiments, the power control signal generated by the power control interface 44 may define a backlight illumination level. In other embodiments, the power control signal may define a target power parameter, such as a desired average power 45, which may instruct a power control module 52 to set a specific power or illumination level or to select a specific algorithm for modulating backlight power or another power parameter.

In some embodiments, a power control module 52 may receive input from a backlight modulation module 46, which may provide image content data such as an average pixel level, histogram data, maximum pixel level, minimum pixel level and many other image content-related parameters. In some embodiments, a backlight modulation module 46 may provide scene cut data 51 to a power control module 52, however other embodiments may not use this feature.

In some embodiments, the backlight modulation module 46 may receive image data, which may or may not have been altered by the information overlay module 42. This image data will typically comprise image content data, such as pixel values, and may also comprise metadata that describes image content and format data as well as image source, creator, capture and other data. The backlight modulation module 46 may receive image data and analyze or process the image data to determine a selected backlight level 49. In some cases, a selected backlight level 49 may be determined independently of any image data. Once a backlight level is determined, image data may be compensated for non-standard, non-maximum or other backlight changes. Exemplary embodiments of this image compensation are described in the patent applications that are incorporated herein by reference. This compensated image 48 may then be sent to the LCD panel for display.

In some embodiments, a backlight modulation module 46 may provide the selected backlight level signal 49 to the power control module 52, which may modify 58 the selected backlight level based on power control parameters. In some cases, the modified backlight signal 53 may be fed back to the power control module 52 as well as being sent to the backlight control 54 for use when displaying the compensated image 48 on LCD 55.

It should be noted that power rate and cost data received by the power control interface 44 may be used along with user preferences received from the remote control interface 47, or from other input, to create a power control schedule or power control rule set for governing power within PCDD 56 and any other devices connected to the PCDD 56. In some embodiments, an MPCDD 17 may comprise a PCDD 56 and may control a plurality of external devices that are connected via PMUs or via similar connections.

In some embodiments, a PCDD 56 may vary internal backlight levels and other power consumption levels based on power rate and cost data, which may define peak power demand periods, power rate changes, and power discount periods and other cost-related power data. In some embodiments, an MPCDD 17 or a PCDD 56 may also receive regulatory data comprising utility regulations, governmental regulations and other regulations that may be mandatory or voluntary. In these embodiments, user preferences may be set to prescribe automated power control actions, such as backlight control or device power control actions. Regulatory data may be received via a television channel over a cable or RF connection. Regulatory data may also be received via a wireless or wired network connection just as power rate and cost data may be received.

In some embodiments, an exemplary power control algorithm for adaptively dimming a display to meet an average power target without over dimming the display may be used. In some embodiments, the power control module adjusts the maximum BL to achieve the desired target average power. The initial power consumption rate may be set greater than the target; the power control may then scale the selected backlight to reduce the power consumption toward the target. The rate of change of the scaling may be limited to make changes in brightness visually unnoticeable.

Figure 5:
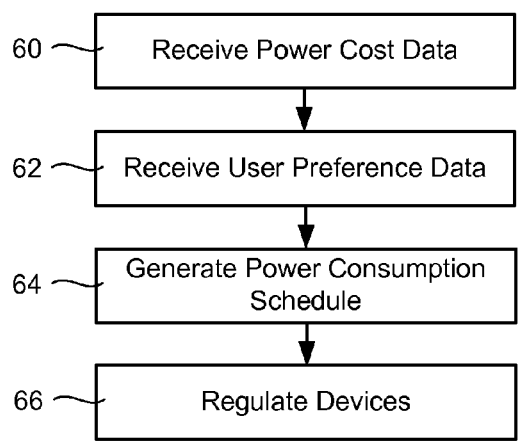
FIG. 5 is a diagram showing an exemplary embodiment wherein a power consumption schedule is generated based on power cost data and user preference data.

Some embodiments of the present invention may be described with reference to FIG. 5. In these embodiments, a power control and display device, such as an MPCDD 17, a PCDD 56 or an MPCSTB 25, may receive 60 power cost data. Power cost data may comprise power rate and cost data including, but not limited to starting and beginning times of time periods of varying power cost. This data may be received from a direct connection, a wired or wireless network connection, a television channel broadcast or by other communication methods.

The power control and display device of these embodiments may also receive 62 user preference data related to power consumption during periods identified in the power cost data. User preference data may be received 62 via a remote control device in communication with the power control and display device or by other communication methods.

Based on the power cost data and the user preference data, the power control and display device may generate 64 a power consumption schedule. A power consumption schedule may comprise power control commands for controlling any power consuming devices in communication with the power control and display device. A power consumption schedule may also comprise power control commands for controlling internal components of the power control and display device, such as a display backlight and accompanying image compensation components. These power control commands may be used internally to generate signals to regulate 66 power consumption of connected devices or internal components or they may be sent directly to connected devices with processing components that read the power control commands to regulate 66 power consumption.

Figure 6:
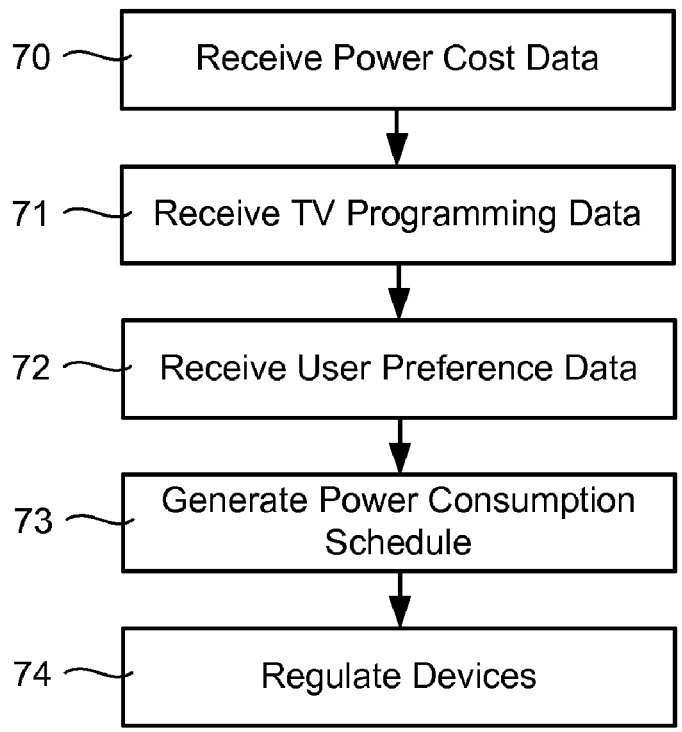
FIG. 6 is a diagram showing an exemplary embodiment wherein a power consumption schedule is generated based on power cost data, television programming data and user preference data.

Some embodiments of the present invention may be described with reference to FIG. 6. In these embodiments, a power control and display device, such as an MPCDD 17, a PCDD 56 or an MPCSTB 25, may receive 70 power cost data. Power cost data may comprise power rate and cost data including, but not limited to starting and beginning times of time periods of varying power cost. This data may be received from a direct connection, a wired or wireless network connection, a television channel broadcast or by other communication methods.

In these embodiments, a power control and display device may also receive 71 television programming data, which may comprise a schedule of the content being broadcast at various times on various channels.

The power control and display device of these embodiments may also receive 72 user preference data related to power consumption during periods identified in the power cost data. User preference data may also comprise information regarding user preferences related to the television programming data. User preference data may be received 72 via a remote control device in communication with the power control and display device or by other communication methods.

Based on the power cost data, the television programming data and the user preference data, the power control and display device may generate 73 a power consumption schedule. A power consumption schedule may comprise power control commands for controlling any power consuming devices in communication with the power control and display device. A power consumption schedule may also comprise power control commands for controlling internal components of the power control and display device, such as a display backlight and accompanying image compensation components. These power control commands may be used internally to generate signals to regulate 74 power consumption of connected devices or internal components or they may be sent directly to connected devices with processing components that read the power control commands to regulate 74 power consumption.

Figure 7:
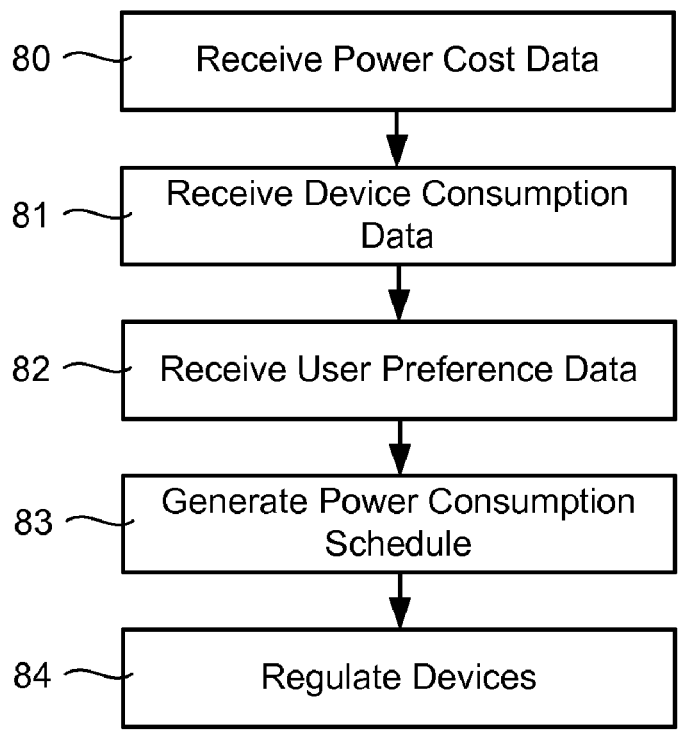
FIG. 7 is a diagram showing an exemplary embodiment wherein a power consumption schedule is generated based on power cost data, device consumption data and user preference data.

Some embodiments of the present invention may be described with reference to FIG. 7. In these embodiments, a power control and display device, such as an MPCDD 17, a PCDD 56 or an MPCSTB 25, may receive 80 power cost data. Power cost data may comprise power rate and cost data including, but not limited to starting and beginning times of time periods of varying power cost. This data may be received from a direct connection, a wired or wireless network connection, a television channel broadcast or by other communication methods.

In these embodiments, a power control and display device may also receive 81 device power consumption data, which may comprise a history of power consumption by connected devices, a list of power consumption by connected devices for various activities or other power consumption information.

The power control and display device of these embodiments may also receive 82 user preference data related to power consumption during periods identified in the power cost data. User preference data may also comprise information regarding user preferences related to the device power consumption. User preference data may be received 82 via a remote control device in communication with the power control and display device or by other communication methods.

Based on the power cost data, the television programming data and the user preference data, the power control and display device may generate 83 a power consumption schedule. A power consumption schedule may comprise power control commands for controlling any power consuming devices in communication with the power control and display device. A power consumption schedule may also comprise power control commands for controlling internal components of the power control and display device, such as a display backlight and accompanying image compensation components. These power control commands may be used internally to generate signals to regulate 84 power consumption of connected devices or internal components or they may be sent directly to connected devices with processing components that read the power control commands to regulate 84 power consumption.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for regulating power consumption with a master power control and display device, said method comprising:
    a) receiving a power cost schedule at said master power control and display device (MPCDD), wherein said MPCDD comprises a processor and a memory;
    b) prompting a user for user preference data related to power consumption by displaying a prompt on a display of said MPCDD;
    c) receiving user preference data related to power consumption at said MPCDD, wherein said user preference data specifies a plurality of specific devices, in communication with said MPCDD;
    d) determining a device control schedule, comprising device control data, for said plurality of specific devices based on said power cost schedule and said user preference data; and
    e) sending said device control data to said plurality of specific devices, wherein said device control data causes said plurality of specific devices to cooperatively modify their power consumption based on said device control data such that power consumption by one device is prioritized over power consumption of a second device.

2. A method as described in claim 1 wherein said receiving a power cost schedule occurs over a wireless network connection.

3. A method as described in claim 1 wherein said receiving a power cost schedule occurs over an RF television channel.

4. A method as described in claim 1 wherein said receiving a power cost schedule occurs over a cable television channel.

5. A method as described in claim 1 wherein said power cost schedule is received from a power supplier.

6. A method as described in claim 1 wherein said power cost schedule comprises a beginning time and an ending time for a peak demand period and accompanying peak demand power cost data.

7. A method as described in claim 1 wherein said power cost schedule comprises a beginning and ending times for a plurality of time periods and power cost data for each of said plurality of time periods.

8. A method as described in claim 1 wherein said power cost schedule comprises a plurality of optional power consumption schedules that may be selected by a user with said user preference data.

9. A method as described in claim 5 further comprising sending a user power rate selection from said MPCDD to said power supplier, wherein said power rate selection identifies a selection of an optional power rate parameter.

10. A method as described in claim 9 wherein said optional power rate parameter defines an optional power rate plan selection whereby a user commits to comply with power consumption limits in exchange for specified power pricing.

11. A method for regulating power consumption with a power-controlled display device, said method comprising:
    a) receiving a power cost schedule at said power-controlled display device (PCDD), wherein said PCDD comprises a processor, a display, a remote control interface and a memory, and where said power cost schedule is received in a data stream that includes a television signal;
    b) prompting a user for user preference data related to power consumption by displaying a prompt on a display of said PCDD;
    c) receiving user preference data related to power consumption at said PCDD via a remote control device that controls said PCDD;
    d) determining a display control schedule, comprising device control data, for said PCDD, said display control schedule being based on said power cost schedule and said user preference data; and
    e) controlling a backlight of said PCDD according to said display control schedule.

12. A method as described in claim 11 further comprising receiving a television programming schedule at said PCDD and wherein said user preference data further comprises television programming preferences.

13. A method as described in claim 11 further comprising compensating an image to compensate for a reduced backlight level resulting from said controlling a backlight.

14. A method as described in claim 13 wherein said compensating an image comprises applying a tonescale adjustment curve to a low-pass version of said image.

15. A method as described in claim 13 wherein said compensating an image comprises applying a tonescale adjustment curve to a low-pass version of said image and applying a constant gain multiplier to a high-pass version of said image.

16. A method as described in claim 13 wherein said compensating an image comprises an analysis of image distortion at a plurality of backlight levels.

17. A method as described in claim 11 wherein said receiving a power cost schedule occurs over an RF television channel.

18. A method as described in claim 11 wherein said receiving a power cost schedule occurs over a cable television channel.

19. A method as described in claim 12 wherein said receiving a television programming schedule occurs over an RF television channel.

20. A method as described in claim 12 wherein said receiving a television programming schedule occurs over a cable television channel.

* * * * *